United States Patent
Ljung

(10) Patent No.: US 11,329,765 B2
(45) Date of Patent: May 10, 2022

(54) REPETITION INDICATOR FOR OPEN SPECTRUM ACCESS

(71) Applicant: Sony Corporation, Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 133 days.

(21) Appl. No.: 16/652,032

(22) PCT Filed: Oct. 1, 2018

(86) PCT No.: PCT/EP2018/076670
§ 371 (c)(1),
(2) Date: Mar. 28, 2020

(87) PCT Pub. No.: WO2019/063845
PCT Pub. Date: Apr. 4, 2019

(65) Prior Publication Data
US 2020/0235859 A1 Jul. 23, 2020

(30) Foreign Application Priority Data
Sep. 29, 2017 (SE) .................... 1730269-6

(51) Int. Cl.
*H04L 1/08* (2006.01)
*H04W 16/14* (2009.01)
(Continued)

(52) U.S. Cl.
CPC ............... *H04L 1/08* (2013.01); *H04W 16/14* (2013.01); *H04W 28/04* (2013.01); *H04W 74/006* (2013.01); *H04W 74/0808* (2013.01)

(58) Field of Classification Search
CPC ... H04L 1/08; H04L 2001/0093; H04L 1/189; H04W 16/14; H04W 28/04; H04W 74/006; H04W 74/0808
See application file for complete search history.

(56) References Cited

U.S. PATENT DOCUMENTS

2015/0078264 A1   3/2015  Han et al.
2016/0277944 A1*  9/2016  Bhushan ................... H04L 5/14
(Continued)

FOREIGN PATENT DOCUMENTS

WO   2016048798 A1   3/2016
WO   2016153025 A1   9/2016

OTHER PUBLICATIONS

International Search Report from corresponding International Application No. PCT/EP2018/076670, dated Jan. 21, 2019, 6 pages.
(Continued)

*Primary Examiner* — Afshawn M Towfighi
(74) *Attorney, Agent, or Firm* — Tucker Ellis LLP

(57) ABSTRACT

An indicator (6011, 6012, 6013) associated with transmission of a plurality of repetitions (351) of data (6001, 6001-1, 6001-2, 6005) to a second device (112) is broadcasted on an open spectrum. The indicator (6011, 6012, 6013) is for control of contention-based access to the open spectrum by at least one further device (131). In response to said transmitting of the indicator (6011, 6012, 6013): a subset (6021, 6022, 6023) of the plurality of repetitions (351) of the data (6001, 6001-1, 6001-2, 6005) is transmitted on the open spectrum to the second device (112).

13 Claims, 7 Drawing Sheets

(51) Int. Cl.
*H04W 28/04* (2009.01)
*H04W 74/00* (2009.01)
*H04W 74/08* (2009.01)

(56) References Cited

U.S. PATENT DOCUMENTS

2017/0012748 A1   1/2017  Dabeer et al.
2017/0070984 A1*  3/2017  Lin .................... H04L 5/0048
2017/0105143 A1*  4/2017  Seok ................. H04W 74/0808
2018/0070403 A1   3/2018  Uemura et al.
2021/0068075 A1*  3/2021  Uesaka .................... H04L 1/08

OTHER PUBLICATIONS

InterDigital, "Remaining Issues on RACH", 3GPP Draft; 3GPP TSG RAN WG1 Meeting #83, R1-157431, Nov. 15-22, 2015, 4 pages.

Swedish Search Report from corresponding Swedish Patent Application No. 1730269-6, dated Jun. 13, 2018, 2 pages.

Qualcomm Inc., "Advanced Frame Structures", 3GPP TSG-RAN WG1 #86bis, R1-1610132, Oct. 10-14, 2016, 9 pages.

\* cited by examiner

REPETITION INDICATOR FOR OPEN SPECTRUM ACCESS

TECHNICAL FIELD

Various examples relate to transmitting a plurality of repetitions of data on an open spectrum. Specifically, various examples relate to transmitting the plurality of repetitions in connection with an indicator for controlling contention-based access to the open spectrum by one or more further devices.

BACKGROUND

Mobile communication by means of cellular networks is an integral part of modern life. Examples of cellular networks include the Third Generation Partnership Project (3GPP) Long Term Evolution (LTE; sometimes also referred to as 4G) and 3GPP New Radio (NR; sometimes also referred to as 5G) technology. Here, multiple devices are connected to form the network. The network may include a plurality of cells.

Such communication systems can be combined with communication on an open spectrum including one or more unlicensed bands. For example, see 3GPP RP-162159 (3GPP TSG RAN Meeting #74, Vienna, Austria, Dec. 5-8, 2016) and RP-162043 (3GPP TSG RAN Meeting #74, Vienna, Austria, Dec. 5-8, 2016).

A particular use case for communication on one or more unlicensed bands of an open spectrum relates to Internet of Things (IoT) solutions. For communication on the open spectrum, the transmission resources are shared among multiple networks, operators, or, generally, any device that intends to access the open spectrum. Typically, this involves listen-before-talk (LBT) procedure to ensure that resources for transmission are available on the unlicensed band. Using an LBT procedure, a channel occupancy measurement may be performed. For example, a signal level may be determined. If the signal level exceeds a threshold, the LBT may be unsuccessful since it is likely that at least one further device occupies the open spectrum.

Alternatively or additionally to LBT techniques, back-off procedures can be applied. According to back-off procedures, a transmission attempt resulting in a collision with one or more further devices attempting to transmit on the open spectrum can result in a further retransmission attempt, e.g., after a random timeout time duration. For example, an LBT procedure may include a back-off procedure, e.g., depending on the outcome of the channel occupancy measurement.

Further, in mobile communication it is typically desirable to provide large coverage. A set of features where a comparably large coverage is achieved is referred to as Coverage Enhancement (CE). CE technology is envisioned to be applied for Machine Type Communication (MTC) and the Narrowband IoT (NB-IOT), sometimes also referred to as NB-LTE. For example, such techniques may be based on the 3GPP LTE technology to some extent and may reuse some of the LTE concepts.

A key feature of the CE is to implement transmission of multiple repetitions of data (sometimes also referred to as retransmission). Here, each repetition may include the same redundancy version of encoded data. The repetitions may be "blind", i.e., may not in response to a respective retransmission request that may be defined with respect to a Hybrid Acknowledgment Repeat Request protocol (HARQ protocol). Rather, repetitions according to CE may be preemptive. Examples are provided by the 3GPP Technical Report (TR) 45.820 version 13.0.0 (2015 August), section 6.2.1.3. By employing CE, a likelihood of successful transmission can be increased even in scenarios of poor conditions of communicating on a corresponding wireless link. Thereby, the coverage of networks can be significantly enhanced—even for low transmission powers as envisioned for the MTC and NB-IOT domain.

However, techniques of CE may face certain restrictions and drawbacks in combination with transmission on an open spectrum. In particular, the count of repetitions according to the CE may be larger than 10, sometimes larger than 100, sometimes even larger than 2000. Then, a combination of CE implementing large counts of repetitions and a highly-utilized open spectrum can result in a significantly increased likelihood of collisions. This may be due to the increased transmission time required for the large count of repetitions according to the CE. Transmission collisions result typically in back-off and, consequently, further repetitions. This can increase the latency and may result in increased energy consumption for the transmitting device.

SUMMARY

Therefore, a need exists for advanced techniques of transmission of a plurality of repetitions of data on an open spectrum. Specifically, a need exists for techniques which overcome or mitigate at least some of the above-identified restrictions and drawbacks.

This need is met by the features of the independent claims. The features of the dependent claims define embodiments.

A method of operating a first device includes broadcasting an indicator. The indicator is broadcasted on an open spectrum. The indicator is associated with transmission of a plurality of repetitions of data to a second device. The indicator is for control of contention-based access to the open spectrum by at least one further device. The method also includes, in response to said transmitting of the indicator, transmitting a subset of the plurality of repetitions of the data to the second device and on the open spectrum.

By means of the indicators possible to create awareness of the at least one further device of the following transmission of the plurality of repetitions. This may in particular be helpful where a comparably large count of repetitions is transmitted, e.g., under a CE policy.

For example, the subset may be the first subset of a plurality of subsets into which the plurality of repetitions is broken down. The subset may be a subsequent subset of the plurality of subsets. The various subsets may be transmitted consecutively and optionally time-offset. The subsets may each include less than all of the plurality of repetitions. The plurality of repetitions may be divided into the plurality of subsets.

The indicator may be indicative of resources on the open spectrum required for transmitting the subset of the plurality of repetitions of the data. Alternatively or additionally, the indicator may be indicative of resources on the open spectrum required for transmitting at least one subsequently transmitted further subset of the plurality of repetitions of the data.

Thereby, it is possible to create awareness of the at least one further device of subsequent transmission of one or more subsets of the plurality of repetitions. Thereby, intermittent transmission of the one or more subsets may be signaled; thereby, tailoring contention-based access to the open spectrum is possible.

For example, the access to the open spectrum may be in accordance with transmission opportunities defined by a predefined threshold duration. Here, the indicator may be indicative of at least one transmission opportunity required for transmitting the subset of the plurality of repetitions of the data and/or required for transmitting at least one subsequently transmitted further subset of the plurality of repetitions of the data.

In some scenarios, access to the open spectrum may be governed by a rules set which enforces the use of transmission opportunities. Then, the plurality of repetitions may be spread across a plurality of transmission opportunities. In such a scenario, it is possible to create awareness of the at least one further device of one or more transmission opportunities required for transmission of the plurality of repetitions. This may help to tailor contention-based access to the open spectrum.

For example, the indicator may be indicative of whether any further transmission opportunities are required for transmitting the transmission of the plurality of repetitions of the data, beyond the at least one current transmission opportunity required for transmitting the subset of the plurality of repetitions of the data.

By such techniques, it is possible to indicate to the at least one further device whether it should expect further occupation by the spectrum, beyond the current transmission opportunity.

For example, the indicator may be indicative of a least one of a timing and a count of transmission opportunities.

Thereby, details of the expected access to the open spectrum may be signaled to the at least one further device, thereby mitigating collision.

The indicator may be indicative of a repetition level associated with the plurality of repetitions of the data. The repetition level may be defined by a CE policy.

Based on the repetition level, the at least one further device may be enabled to estimate the expected access of the first device to the open spectrum required for completing transmission of the plurality of repetitions.

The method may further include, in response to transmitting the subset of the plurality of repetitions of the data: implementing a listen-before-talk procedure on the open spectrum. The method may then further include, in response to implementing the listen-before-talk procedure: broadcasting, on the open spectrum, a further indicator associated with transmission of the plurality of repetitions of the data to the second device. The further indicator may be for control of contention-based access to the open spectrum by the at least one further device. In response to said transmitting of the further indicator, the method may further include transmitting a further subset of the plurality of repetitions of the data to the second device and on the open spectrum.

By such techniques, it is possible to raise awareness of the at least one further device with respect to transmission of each subset of the plurality of repetitions. This helps to mitigate collision.

The access to the open spectrum may be in accordance with transmission opportunities defined by a predefined threshold duration. Then, the listen-before-talk procedure may be implemented in between a first transmission opportunity in the second transmission opportunity.

Such techniques help to obey predefined rules for accessing the open spectrum; while, at the same time, facilitating timely completion of the transmission of the plurality of repetitions at low latency.

For example, the indicator may be included in the preamble message of the subset of the plurality of repetitions of the data.

Thereby, the indicator may help to reserve access to the open spectrum, prior to start of the transmission of the plurality of repetitions of the data as part of the subset.

It would be possible that the plurality of repetitions all include data encoded according to the same redundancy version for combined decoding at the second device.

Thereby, CE techniques may be employed.

A method of operating a first device includes receiving, from a second device and on an open spectrum, and indicator. The indicator is associated with transmission of a plurality of repetitions of data from the second device to a third device. Then, based on the indicator, contention-based access to the open spectrum by the first device may be controlled.

This may help to avoid collision between the first device attempting to access the open spectrum and the second device attempting to access the open spectrum for transmission of the plurality of repetitions of the data.

The indicator may be indicative of resources on the open spectrum required for transmitting the subset of the plurality of repetitions of the data. Alternatively or additionally, the indicator may be indicative of resources on the open spectrum required for transmitting at least one subsequently transmitted further subset of the plurality of repetitions of the data. The method may further include setting a back-off time of the contention-based access to avoid access to the open spectrum and the resources.

By appropriately setting the back-off time, collision can be mitigated. In particular, access to the open spectrum can be delayed until completion of the transmission of the plurality of repetitions by the second device. It would also be possible to tailor access of the open spectrum by the first device such that it coincides with a gap between subsequent transmission opportunities assigned to the second device.

The access to the open spectrum may be in accordance with a least one transmission opportunity defined by a predefined threshold. Here, the indicator may be indicative of a least one transmission opportunity required for transmitting the subset of the plurality of repetitions of the data. Alternatively or additionally, the indicator may be indicative of a least one transmission opportunity required for transmitting at least one subsequently transmitted further subset of the plurality of repetitions of the data. The method may further include setting a back-off time of the contention-based access to avoid access to the open spectrum prior to completion of the at least one transmission opportunity.

Again, such techniques may mitigate collision. Synchronized access to the open spectrum between the first device and the second device becomes possible.

A first device includes control circuitry which is configured to broadcast, on an open spectrum, an indicator associated with transmission of a plurality of repetitions of data to a second device. The indicator is for control of contention-based access to the open spectrum by least one further device. The control circuitry is further configured to transmit, on the open spectrum, a subset of the plurality of repetitions of the data to the second device, in response to said transmitting of the indicator.

For such a first device, effects may be obtained which are comparable to the effect that may be obtained by a method according to a further aspect.

A first device includes control circuitry configured to receive, from a second device and on an open spectrum, and indicator. The indicator is associated with transmission of a plurality of repetitions of data from the second device to a third device. The control circuitry is further configured to control contention-based access to the open spectrum by the first device, based on the indicator.

For such a first device, effects may be obtained which are comparable to the effects that may be obtained by a method according to a further aspect.

A computer program product or a computer program includes program code that may be executed by least one processor. Executing the program code causes the at least one processor to perform a method of operating a first device. The method includes broadcasting an indicator. The indicator is broadcasted on an open spectrum. The indicator is associated with transmission of a plurality of repetitions of data to a second device. The indicator is for control of contention-based access to the open spectrum by at least one further device. The method also includes, in response to said transmitting of the indicator, transmitting a subset of the plurality of repetitions of the data to the second device and on the open spectrum.

A computer program product or a computer program includes program code that may be executed by least one processor. Executing the program code causes the at least one processor to perform a method of operating a first device. The method includes receiving, from a second device and on an open spectrum, and indicator. The indicator is associated with transmission of a plurality of repetitions of data from the second device to a third device. Then, based on the indicator, contention-based access to the open spectrum by the first device may be controlled.

An indicator for controlling contention-based access to an open spectrum by at least one further device is associated with transmission of a plurality of repetitions of data from a first device to a second device.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
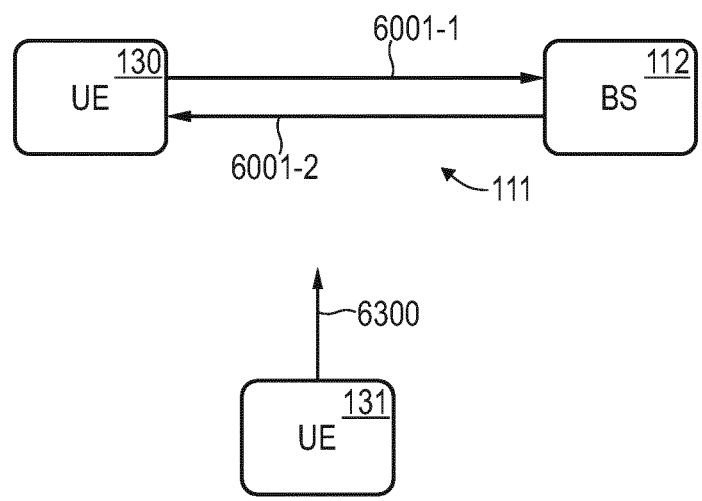
FIG. 1 schematically illustrates devices communicating on an open spectrum according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of transmitting and/or receiving (communicating) data between devices are disclosed. The data may be wirelessly communicated on a radio link. For example, encoded data may be communicated. The data may be communicated according to a redundancy version.

For example, the data may correspond to payload data of applications implemented at one or more devices. Alternatively or additionally, the data may correspond to control data, e.g., Layer 2 or Layer 3 control data according to the Open Systems Interface (OSI) model.

According to various examples, the data may be uplink (UL) data or downlink (DL) data. For example, the data may be UL data transmitted from a mobile device (user equipment; UE) to a base station (BS). It would also be possible that the data is DL data transmitted from the BS to the UE. In other examples, device-to-device (D2D) communication on a sidelink of the wireless link of the network between two UEs could be employed.

The data may be encoded. According to examples, the encoded data is redundantly communicated using a plurality of repetitions. Hence, the same encoded version of the data may be redundantly communicated a number of times according to various examples. Each repetition of the plurality of repetitions can include the data encoded according to the same redundancy version, e.g., redundancy version 0 or redundancy version 1, etc. Then, it is possible to combine the plurality of repetitions of the encoded data. Such combination may be implemented in analog domain, e.g., in the baseband. The combination yields a combined signal. Then, the decoding of the encoded data can be based on the combined signal. Thus, by aggregating the received information across the multiple repetitions, the probability of successfully decoding of the encoded data increases. This facilitates CE. Such techniques of CE may find particular application in the framework of the IoT technology, e.g., according to 3GPP MTC or NB-IOT. Here, typically, the transmitting UE implements a comparably low transmit power. Due to the multiple repetitions of the encoded data, nonetheless, a sufficiently high likelihood of successfully receiving and decoding the encoded data is provided for.

When employing CE, a device transmitting a plurality of repetitions of data may achieve a better aggregated signal-to-noise-end-interference-ratio (SNIR) by transmitting the plurality of repetitions of the data, each repetition including the same information. The receiving device can combine received signals associated with the plurality of repetitions of the data. Thereby, the aggregated link budget is improved further than what is enabled by the lowest order of modulation and coding scheme for a single transmission.

When implementing CE, the count of the plurality of repetitions is typically defined based on a repetition level of a CE policy.

The various techniques described herein may find particular application for transmission of a plurality of repetitions of data on an open spectrum. Multiple operators may share access to the open spectrum. In other words, access to the open spectrum may not be restricted to a single operator or network. Typically, the communication on the open spectrum may involve LBT procedures and/or back-off procedures. Such techniques are sometimes also referred to as Carrier Sense Multiple Access/Collision Avoidance (CSMA/CA). Examples of existing and future radio access techniques that may use an open spectrum include 3GPP NR unlicensed, IEEE or Multifire standards of MulteFire Alliance, 5177 Brandin Court, Fremont, Calif. 94538. 3GPP unlicensed is described, e.g., by 3GPP TSG RAN Meeting #75 RP-170828 Dubrovnik, Croatia, Mar. 6-9, 2017.

Often, access to an open spectrum is governed by a common and predefined rule set. Various devices which intend to access the open spectrum are then to follow and implement the predefined rule set. For example, transmission opportunities may be defined in connection with such a rule set. Transmission opportunities may limit the maximum contiguous time for which any device may access the open spectrum. Additionally or alternatively, transmission opportunities may limit the relation in time between transmitting and not transmitting on the open spectrum, counted as the average over a certain time period. As such, transmission opportunities may be associated with a duty cycle of access to the open spectrum. Hence, contiguous access to the open spectrum may be limited by a predefined threshold duration, wherein the threshold duration defines the transmission opportunity. Sometimes, transmission opportunities are also referred to as transmission windows. Subsequent transmission opportunities for a given device may be offset in time domain by a time gap. The time gap may have a minimum duration which may, e.g., be defined by a predefined further threshold duration. It would be possible that the time gap is used by the given device to perform a further LBT procedure; once the LBT procedure has been successfully completed, the next transmission opportunity commences. Therefore, if the LBT procedure between a first transmission opportunity and a subsequent second transmission opportunity fails, the time gap between the first transmission opportunity transmission opportunity may be prolonged. As will be appreciated, the overall transmission time may significantly increase if the LBT procedure fails often. This increases latency.

Various techniques described herein help to combine transmission of a plurality of repetitions of data—e.g., under a CE policy—with communication on an open spectrum. Specifically, various techniques described herein facilitate mitigation of collision on the open spectrum when implementing the transmission of the plurality of repetitions of the data. The techniques described herein facilitate transmission of data at small transmission times.

According to examples, this is achieved by broadcasting, on the open spectrum, an indicator associated with transmission of a plurality of repetitions of data. For example, the indicator may be broadcasted by a first device. For example, the transmission of the plurality of repetitions of the data may be from the first device to a second device. The indicator may be for control of contention-based access to the open spectrum by at least one further device that may be different to the first device and the second device. In response to said transmitting of the indicator, it may then be possible to transmit at least a subset or even all of the plurality of repetitions of the data to the second device on the second spectrum.

Hence, the indicator may be indicative of the subsequent transmission of the subset of the plurality of repetitions of the data being under a CE policy. This helps to inform the at least one further device of any potential constraints imposed by such transmission on the CE policy. Thereby, the at least one further device may take appropriate action to mitigate collision.

Such techniques are based on the finding that reference implementations of mitigating collision on an open spectrum may not be suitable or only suitable to a limited degree for application of a transmission of a plurality of repetitions of data under a CE policy. Namely, on an open spectrum, a plurality of devices intending to transmit will typically compete with each other for access to the open spectrum at the same time. According to reference implementations, to address this issue, headers/preambles for indicating a transmission intention can be used. This helps to achieve some coordination or information sharing regarding the intended access to the spectrum. For example, a transmission burst can be announced to other devices by means of such a preamble. An example is the Ready to Send/The to Send (RTS/CTS) indicators according to IEEE 802.11x Wi-Fi protocols. However, such reference implementations of mitigating collision based on RTS/CTS indicators or the like face certain restrictions when being applied in combination with the transmission of the plurality of repetitions of the data under the CE policy. Namely, due to the large count of repetitions typically required for the transmission under the CE policy, conventional techniques for mitigating the collision may have a limited efficiency. For example, reference implementations may not be suited for indicating that multiple repetitions are planned, e.g., across multiple transmission opportunities. Namely, if the time gap between the multiple transmission opportunities is prolonged due to third-party access to the open spectrum and a consequently unsuccessful LBT procedure, this may significantly increase the latency of the transmission of the plurality of repetitions under the CE policy. Then, since the receiver of the receiving device may be required to buffer all signals before attempting decoding, the receiver complexity is increased if the time until completion of the transmission of the plurality of repetitions of the data is increased. For example, memory-management techniques may be required. It may be required to increase the memory. The repetitions and, potentially, additional repetitions in case of a collision will result in long channel occupancy and therefore reduce the overall system capacity. Also, an increased duration until completion of the transmission of the plurality of repetitions of the data—i.e., the increased transmission time—will increase the drain of the battery of the receiving device and/or of the transmitting device. Energy efficiency, however, is important, in particular in connection with IOT devices.

All such drawbacks and restrictions of reference implementations may be addressed by the techniques described herein using the indicator associated with the transmission of the plurality of repetitions of the data. Namely, the indicator helps to minimize the transmission time until successful completion of the plurality of repetitions. Therefore, the indicator helps to optimize access to the open spectrum, both, from a device perspective, as well as from a system perspective. This is achieved by informing other devices accessing the open spectrum about the intention to transmit the plurality of repetitions of the data, e.g., across a plurality of transmission opportunities. By appropriately controlling access of the other devices to the open spectrum, completion of the transmission of the plurality of repetitions of the data can be completed quickly and efficiently.

FIG. 1 schematically illustrates aspects with respect to transmission of data between multiple devices 112, 130. In the example of FIG. 1, UL data 6001-1 may be transmitted by a UE 130 and may be received by a BS 112; DL data 6001-2 may be transmitted by the BS 112 and may be received by the UE 130. The data 6001-1, 6001-2 is transmitted on a wireless link 111.

For example, the UE 130 may be selected from the group including: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long.

The wireless link 111 may occupy certain resources on a spectrum, e.g., at least in parts on an open spectrum. The wireless link 111 may implement a transmission protocol. The transmission protocol may be defined in the context of a network to which the UE 130 is connected via the base station 112. The techniques described herein are capable of indicating a transmission intent across multiple transmission protocols. Thus, interoperability between multiple networks is facilitated.

The techniques described herein may be applied to various networks/network architectures. Examples include 3GPP Long Term Evolution (LTE) networks, here specifically LTE-U for communication on the open spectrum. Further examples, include 3GPP NR, here specifically NR-U for communication on the open spectrum. Still further examples include IEEE Wi-Fi or Multifire.

FIG. 1 also illustrates aspects with respect to contention-based access to the resources on the open spectrum. In FIG. 1, a further UE 131 is illustrated which may attempt to transmit data 6300 on the resources of the open spectrum also occupied by the wireless link 111. There may be no central scheduling available for communication on the wireless link 111 on the one hand side and transmitting of the data 6300 on the other hand side. For example, it would be possible that communication on the wireless link 111 is applied in accordance with a first radio access technology, while transmission of the data 6300 is in accordance with a second radio access technology different from the first radio access technology.

To mitigate collision, e.g., between the UE 130 attempting to transmit the data 6001-1 and the UE 131 attempting to transmit the data 6300, LBT and/or random back-off procedures may be implemented.

Figure 2:
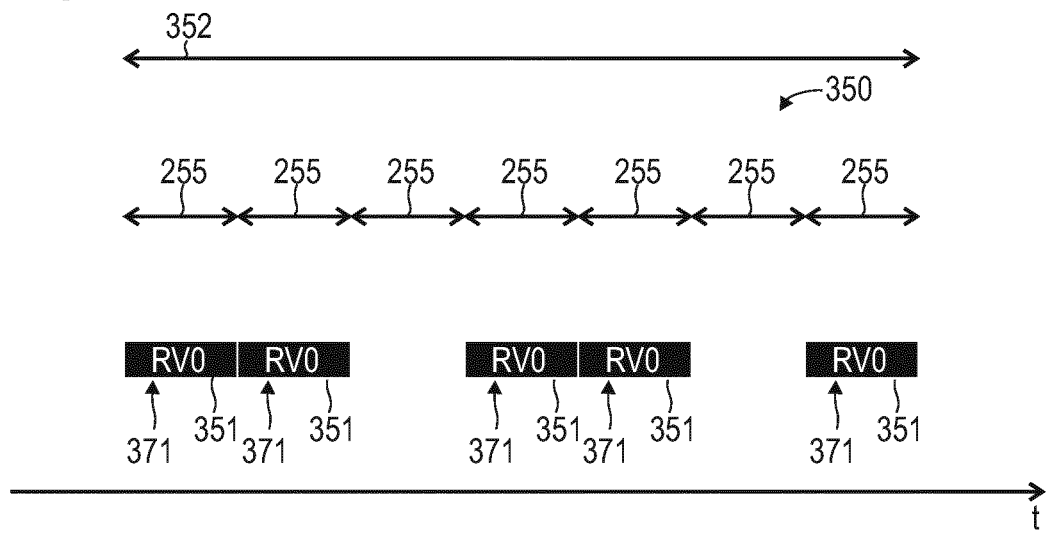
FIG. 2 schematically illustrates transmission of a plurality of repetitions of data under a CE policy according to various examples.

FIG. 2 illustrates aspects with respect to CE. In particular, FIG. 2 illustrates aspects with respect to a burst 350 including multiple repetitions 351 of data encoded according to a redundancy version 371. As can be seen from FIG. 3, the plurality of repetitions 351 are communicated in a plurality of subframes 255. The transmission burst 350 of the repetitions 351 has a certain duration 352. The duration 352 correlates with the count of repetitions 351. The count of repetitions 351 may be defined by a repetition level defined in turn by the respective CE policy.

Each subframe 255 may include multiple resource elements arranged in a time-frequency resource grid. Each subframe may hence accommodate a plurality of symbols, wherein each resource element may carry one or more symbols. For example, each subframe 255 may include a plurality of subcarriers defined by an Orthogonal Frequency Division Multiplex (OFDM) modulation.

For transmitting the plurality of repetitions 351, frequency hopping may or may not be employed. For example, multiple different subcarriers may be occupied by different repetitions 351.

While in the example of FIG. 2, the plurality of repetitions 351 occupy subsequent subframes 255, in other examples, it would also be possible that the plurality of repetitions 351 fit into a single subframe 255.

Figure 3:
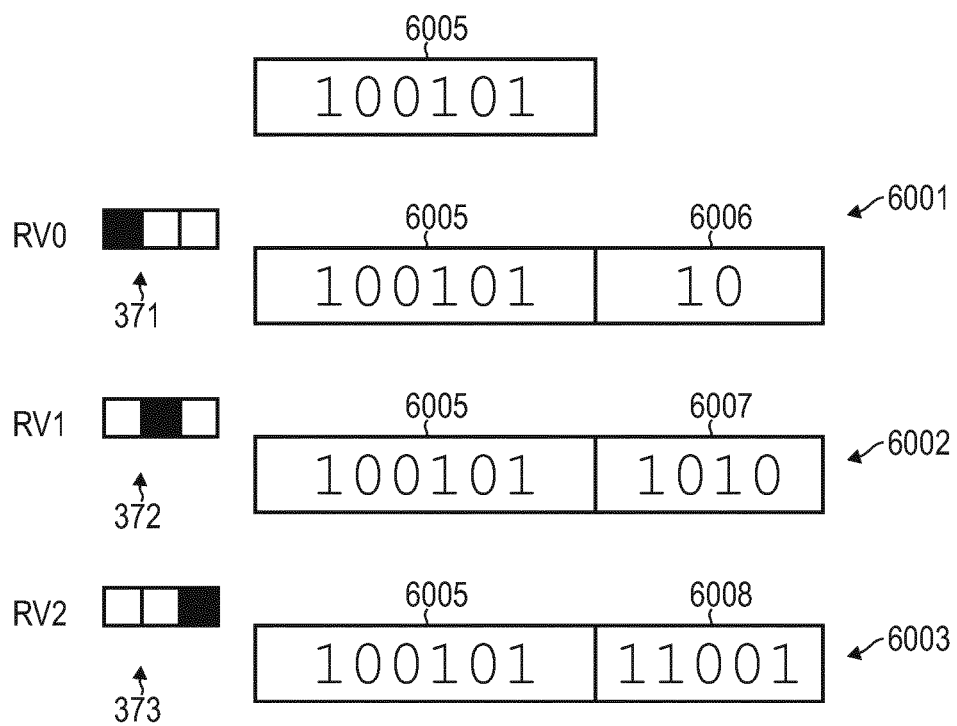
FIG. 3 schematically illustrates encoding data according to different redundancy versions according to various examples.

FIG. 3 illustrates aspects of encoding raw data 6005 according to different redundancy versions 371-373. A given redundancy version 371-373 may be used for transmitting a plurality of repetitions of the corresponding data 6001-6003 when employing CE.

As can be seen from FIG. 3, the raw data 6005 includes a sequence of bits. For example, the raw data 6005 can be a data packet, e.g., a MAC layer Service Data Unit (SDU). It would also be possible that the raw data 6005 corresponds to a RRC command or other control data such as a ACK, NACK, UL grant, or DL assignment.

Encoding the raw data 6005 can correspond to adding a checksum 6006-6008 to the raw data 6005 to yield the encoded data 6001-6003. Different checksums 6006-6008 can be used for different redundancy versions.

Different techniques of encoding can be employed such as, e.g., Reed Solomon encoding, turbo convolutional encoding, convolutional coding, etc. Provisioning the checksum 6006-6008 can facilitate reconstruction of corrupted bits of the encoded data 6001-6003 according to the coding scheme. Typically, the longer (shorter) the checksum 6006-6008, the more (less) robust the communication of the corresponding data 6001-6003 against noise and channel imperfections; thus, a probability for successful transmission of the raw data 6005 can be tailored by the length of the checksum. Alternatively or additionally, encoding the data can correspond to applying interleaving where the bits of the raw data 6005 are shuffled (not shown in FIG. 4).

Figure 4:
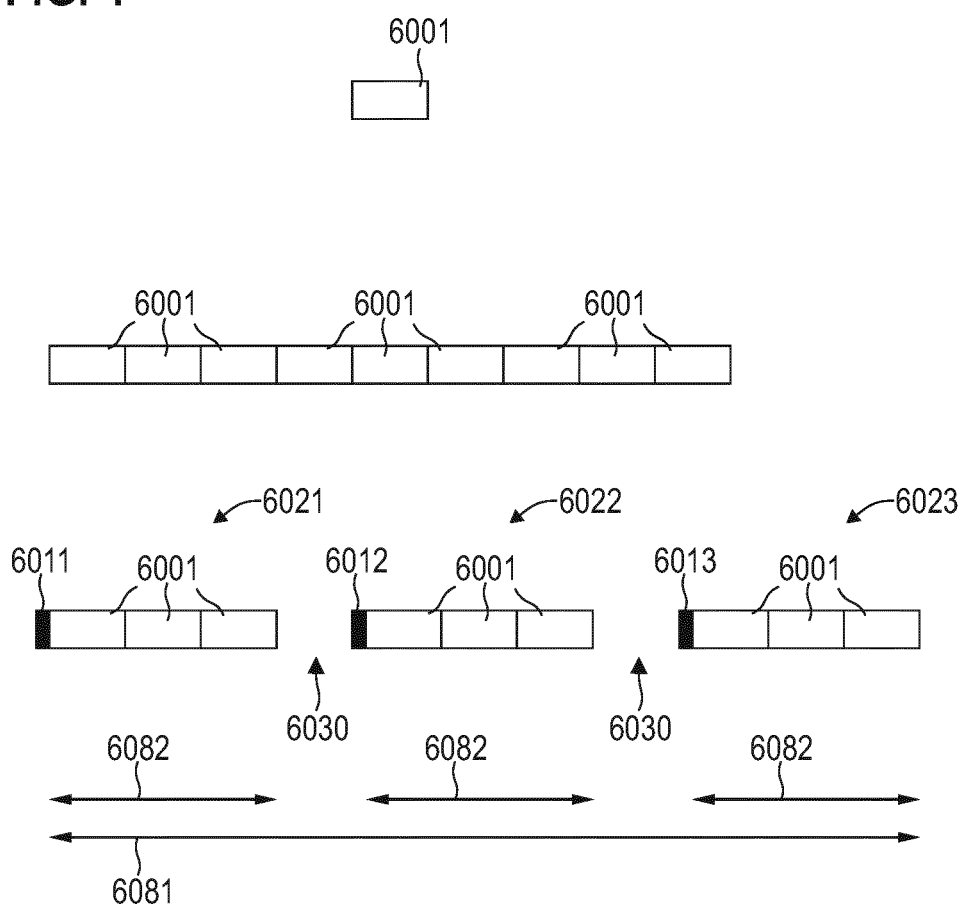
FIG. 4 schematically illustrates transmission of a plurality of subsets of a plurality of repetitions of the data according to various examples.

Typically, different redundancy versions 371-373 correspond to checksums 6006-6008 of different length (as illustrated in FIG. 4). In other examples, it would also be possible that different redundancy version 371-373 employ checksums 6006-6008 of the same length, but encoded according to the different coding scheme. Alternatively or additionally, different redundancy versions may employ different interleaving schemes. Alternatively or additionally, different redundancy versions may employ different puncturing schemes.

FIG. 4 illustrates aspects with respect to transmitting a plurality of repetitions of data 6001. For example, the plurality of repetitions could be repetitions 351 transmitted under a CE policy where each repetition 351 would include the data 6001 encoded according to one and the same redundancy version 371-373 (cf. FIG. 3) for combined decoding at the recipient device. For example, the data 6001 may be transmitted by the UE 130 for reception by the BS 112 (cf. FIG. 1).

In FIG. 4, it is illustrated that instead of transmitting all repetitions of the data 6001 in one contiguous series, multiple subsets 6021-6023 are formed. Then, initially, the subset 6021 including some of all repetitions is transmitted; subsequently—e.g., after a time gap 6030—the subsets 6022 and 6023 are transmitted. FIG. 4 illustrates the overall transmission time 6081 required for completing transmission of all repetitions of the data 6001.

As a general rule, subsets 6021-6023 may be formed for a variety of reasons. One reason can be to limit the contiguous channel access time to the open spectrum, or to limit the ratio in time between transmissions and non-transmissions by a certain device. Other reasons include hardware limitations of a transmitter of the UE 130. For example, a contiguous transmission burst associated with a subset may be limited by the transmitter hardware in time. This may be the case where a size-limited energy storage such as a capacitor etc. is used.

By transmitting the multiple repetitions using the subsets 6021-6023, the time gaps 6030 can be provided. Using the time gaps 6030, the contiguous channel occupancy time 6082 is limited. This helps to mitigate collision. Further, the time gaps 6030 may be used for implementing channel measurements, e.g., to obtain synchronization with a BS 112, etc. During the time gaps, a LBT procedure may be performed; upon successful completing of the LBT procedure, the next subset 6021-6023 may be transmitted.

Specifically, for each subset 6021-6023, a respective indicator 6011-6013 is transmitted. For example, the indicator 6011-6013 may be broadcasted such that further devices 131—even operating according to another transmission protocol—may receive the indicators 6011-6013. While in FIG. 4 an example is illustrated in which the transmission of each subset 6021-6023 is accompanied by transmission of a respective indicator 6011-6013, in other examples it is possible that only one or only some of the subsets 6021-6023 are accompanied by transmission of a respective indicator.

The indicators 6011-6013 are for controlling contention-based access to the open spectrum by further devices 131.

For example, the indicators 6011-6013 may be implemented as one or more bits prior to the transmission of the data 6001 in the respective subset 6021-6023. There may be no other data or symbols arranged in between the indicators 6011-6013 and the data 6001 in the respective subset 6021-6023. For example, the indicator 6011 may be included in the preamble message of the subset 6021; likewise, the indicators 6012, 6013 may be included in preamble messages of the subsets 6022, 6023. For example, the indicators 6011-6013 may include a set of bits, e.g., between 2 and 10 bits or preferably 4-5 bits. The indicators 6011-6013 can implement a control signal, e.g., a Level 2 Medium Access Control (MAC) control signal in connection with multiFire 3GPP LTE, or a MAC packet header in connection with IEEE protocols. The indicators 6011-6013 may help to inform further devices 131—other than the recipient of the data 6001—about upcoming further channel access by the originator of the data 6001, due to the plurality of repetitions to be transmitted, e.g., according to the CE policy.

The further devices 131 can receive the indicators 6011-6013 and the control contention-based access to the spectrum based thereon.

There are various options available for controlling contention-based access based on the indicators 6011-6013:

In a first example, it would be possible that the indicators 6011 is indicative of resources—e.g., defined in frequency domain, time domain, and/or code domain—on the open spectrum required for transmitting the respective subset 6021. Alternatively or additionally, it would be possible that the indicator 6011 is indicative of resources—e.g., defined in frequency domain, time domain, and/or code domain—on the spectrum required for transmitting the subsequent subset 6022 and/or the further subsequent subset 6023, or in general, any subsequent subsets 6022, 6022. Thereby, one or more further devices 131 may implement an appropriate back-off time or another multiplexing technique for avoiding collision. The back-off time can be set to avoid collision in the indicated resources. For example, the back-off time may be set to be larger than the transmission time 6081.

In a second example—which may be employed alternatively or additionally with further examples of controlling contention-based access based on the indicators 6011-6013—the indicators 6011-6013 may be indicative of a repetition level defined by the CE policy. For example, the repetition level may be defined by the CE policy according to some predefined rule set; then, one or more of the indicators 6011-6013 may cross-reference to this predefined rule set. The repetition level may be an indication of how many repetitions are required before completing transmission of the data. Therefore, the repetition level can be a appropriate measure for implementing a tailored back off time. The repetition level can, in other words, correlate with the expected transmission time 3081.

A third example—which may be employed alternatively or additionally with further examples of controlling contention-based access based on the indicators 6011-6013—relies on the transmission opportunities defined in the context of the open spectrum. This is illustrated in FIG. 5.

Figure 5:
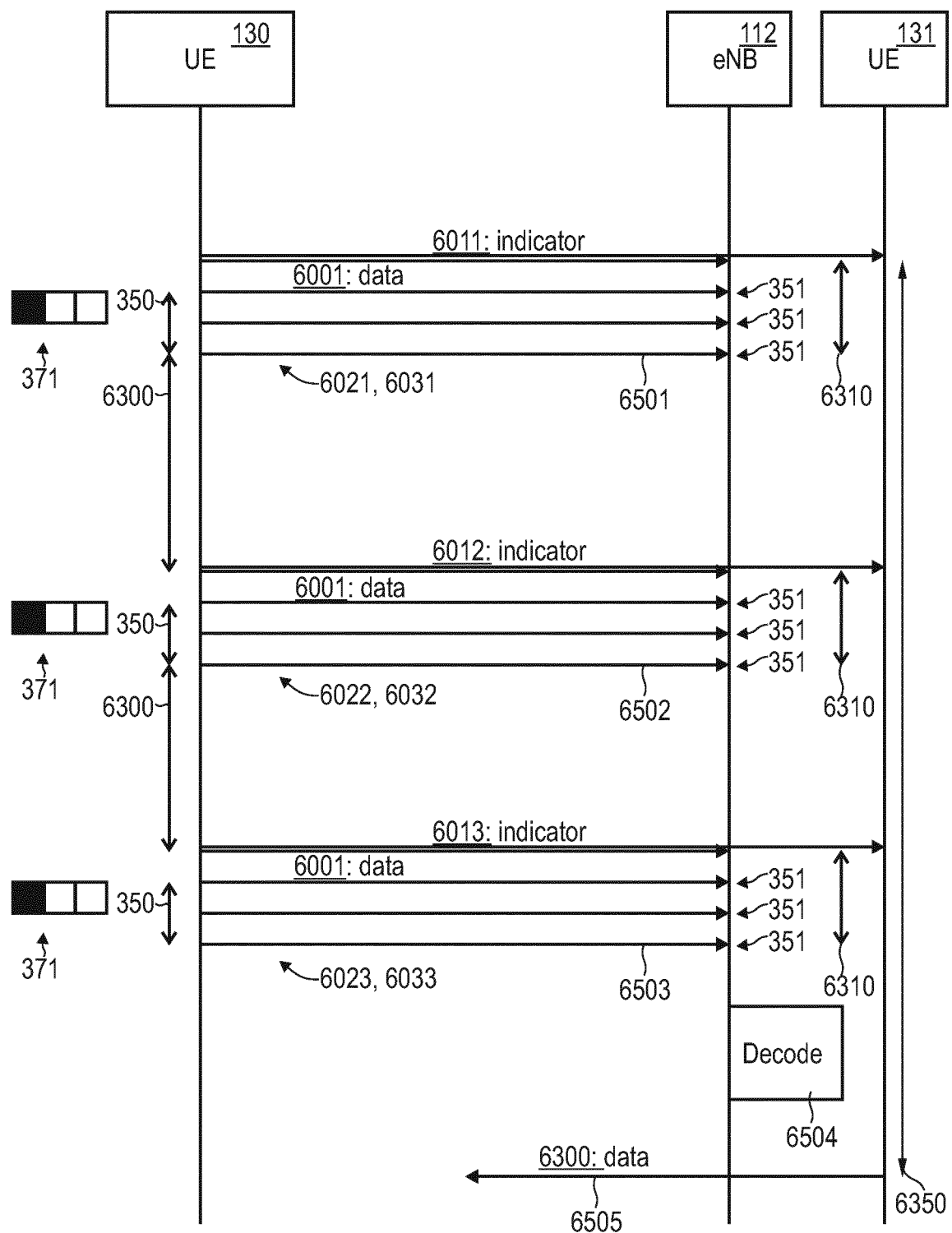
FIG. 5 is a signaling diagram schematically illustrating transmission of the plurality of subsets of the plurality of repetitions of the data according to various examples.

FIG. 5 illustrates aspects with respect to transmitting a plurality of repetitions of data 6001. In FIG. 5, the plurality of repetitions are repetitions 351 transmitted under a CE policy where each repetition 351 includes the data 6001 encoded according to the same redundancy version 371-373 (cf. FIG. 3) for combined decoding 6504 at the recipient device. For example, the data 6001 may be transmitted by the UE 130 for reception by the BS 112 (cf. FIG. 1).

In FIG. 5, a threshold duration 6310 is illustrated. The threshold duration 6310 defines transmission opportunities 6031-6033. One subset 6021-6023 is transmitted per transmission opportunity 6031-6033. Hence, there may be a 1:1 mapping of subsets 6021-6023 to transmission opportunities 6031-6033. In other examples, there may be a n:1 mapping of subsets 6021-6023 to transmission opportunities 6031-6033, where n>1. This may be helpful, where here are other criteria influencing the forming of the subsets. Such decision criteria may be rooted in the hardware capability of a transmitter—e.g., with respect to burst transmission, etc. Then, if the count of repetitions per subset 6021-6023 is limited due to such other criteria, it may be possible to fit more than a single subset 6021-6023 into a single transmission opportunity 6031-6033.

At 6051 multiple repetitions 351 of the data 6001—encoded according to the redundancy version 371—are transmitted, subsequent to broadcasting of the indicator 6011. The threshold duration 6301 is not exceeded. Hence, the forming of subsets 6021-6023 may be based on the threshold duration 6301.

For example, in response to completion of the transmission opportunity 6031, a LBT procedure may be implemented by the UE 130 on the open spectrum. If the LBT procedure is successful, then the next indicator 6012 may be broadcasted on the open spectrum: at 6502 further repetitions 351 data 6001—still encoded according to the same redundancy version 371—are transmitted, subsequent to broadcasting of the indicator 6012. At 6503, still further repetitions 351 of the data 6001—still encoded according to the same redundancy version 371—are transmitted, subsequent to broadcasting of the indicator 6013. As will be appreciated, LBT procedures can be implemented in-between the subsequent transmission opportunities 6031, 6032 and 6032, 6033.

Then, at 6504, BS 112 performs time domain averaging of all signals received during the transmission opportunities 6031-6033 and, based on the time-averaged signal, performs decoding.

The UE 131—based on the indicator 6011—implements a back off procedure, i.e., avoids access to the open spectrum. This may be in combination with a LBT procedure. A back-off time 6350 is indicated. Transmission of the data 6300 is delayed until 6505 by the back-off time 6350. The back-off time can be tailored in duration based on the indicator 6011. Hence, a back-off time 6350 set too large can be avoided; and a back-off time 6350 set too short may be avoided, as well. This optimizes access to the open spectrum on system level.

Specifically, in FIG. 5, the indicator 6011 is indicative of the transmission opportunities 6031-6033 for transmitting the subsets 6021-6023 until completion of all repetitions 351. Based on this indication of the transmission opportunities 6031-6033, the UE 131 can tailor the back-off time duration 6035. To this end, the UE 131 may take into account a predefined rule-set of access to the open spectrum: this rule-set may be indicative of the typical duration per transmission opportunity 6031-6033. Hence, the UE 131 can estimate the expected transmission time 6081 based on the indicator 6011 and the rule-set; and, based on the expected transmission time 6081 set the back-off time duration 6035.

For example, the indicator 6011 could be configured with the sequence number. The sequence number could be indicative of the count/number of estimated additional transmission opportunities 6022, 6023 required in order to finalize to complete number of repetitions 351. Generally, the indicator 6011 could be indicative of at least one of a timing and the count of the remaining transmission opportunities 6022, 6023. Then the back-off time can be set to avoid access to the open spectrum prior to completion of the transmission opportunities 6022, 6023.

This is illustrated in the following example: considering a scenario whether repetition level defined by the CE policy corresponds to account of two hundred repetitions 351. Then, the communication protocol employed and the modulation and coding scheme may allow for seventy repetitions 351 per subset 6021-6023 and per transmission opportunity 6031-6033. In a manner comparable to the example illustrated in FIG. 5, then, a total of three transmission opportunities 6031-6033 is required for completion of the transmission of the data 6001. A first indicator 6011 transmitted during a first transmission opportunity 6021 then carries the sequence number "2": this is because two further transmission opportunities 6022, 6023 beyond the current transmission opportunity 6021 are required for completion of the transmission of the data 6001. A second indicator 6012 transmitted during the second transmission opportunity 6022 carries the sequence number "1": this is because one further transmission opportunity 6023 beyond the current transmission opportunity 6022 is required for completion of transmission of the data 6001. Finally, the third indicator 6013 transmitted during the third transmission opportunity 6023 carries the sequence number "0": this is because no further transmission opportunity is required for completion of transmission of the data 6001.

In such a scenario, upon reception of the first indicator 6011, the UE 131 can appropriately set the back-off time 6350 to avoid access to the open spectrum until completion of all repetitions 351 across all subsets 6021-6023 of the data 6001. Hence, the back-off time 6350 spans multiple transmission opportunities 6031-6033.

In another example, the indicators 6011-6013 could be simply indicative—e.g., by a 1-bit indicator—whether one or more transmission opportunities, beyond the current transmission opportunity, are required; the specific count may not be indicated. Then, the back-off time 6350 could be iteratively prolonged, from transmission opportunity to transmission opportunity based on the indicator. This helps to compress the indicator to avoid overhead.

Figure 6:
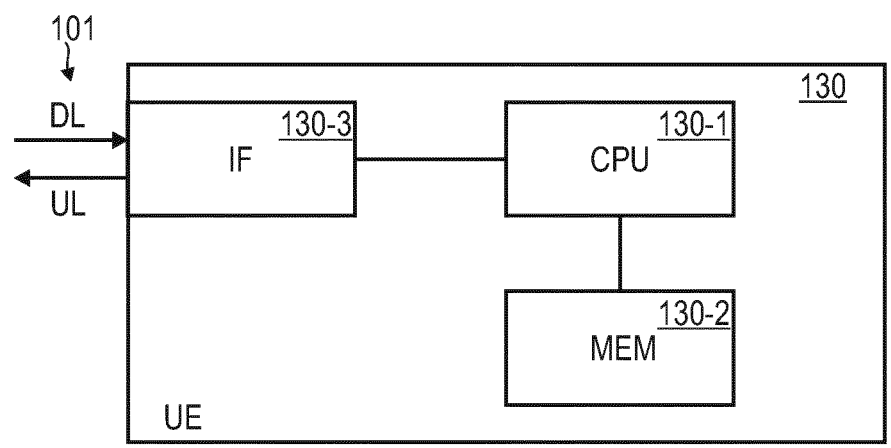
FIG. 6 schematically illustrates a UE according to various examples.

FIG. 6 illustrates aspects with respect to the UE 130. The UE includes a control circuitry 130-1, e.g., implemented by one or more processors. The UE 130 also includes an interface 130-3 configured for communicating on the wireless link 101. Specifically, the interface 130-3 is configured for communicating on an open spectrum. The UE 130 further includes a non-volatile memory 130-2. There may be program code stored in the non-volatile memory 130-2. The program code may be executed by the control circuitry 130-1. Executing the program code can cause the control circuitry to perform techniques described herein with respect to: accessing an open spectrum; implementing a LBT procedure; implementing a random back-off; broadcasting an indicator for controlling contention-based access to the open spectrum; implementing CE techniques; transmitting a plurality of repetitions of data; encoding data according to one or more redundancy versions; etc.

Figure 7:
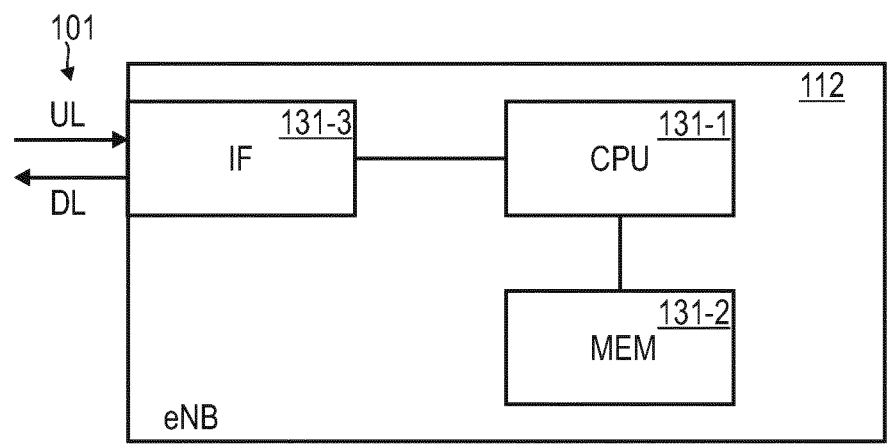
FIG. 7 schematically illustrates a UE according to various examples.

FIG. 7 illustrates aspects with respect to the UE 131. The UE includes a control circuitry 131-1, e.g., implemented by one or more processors. The UE 131 also includes an interface 131-3 configured for communicating on the wireless link 101. Specifically, the interface 131-3 is configured for communicating on an open spectrum. The UE 131 further includes a non-volatile memory 131-2. They may be program code stored in the non-volatile memory 131-2. The program code may be executed by the control circuitry 131-1. Executing the program code can cause the control circuitry to perform techniques described herein with respect to: accessing an open spectrum; implementing a LBT procedure; implementing a random back-off; broadcasting an indicator for controlling contention-based access to the open spectrum; implementing CE techniques; transmitting a plurality of repetitions of data; encoding data according to one or more redundancy versions; etc.

Figure 8:
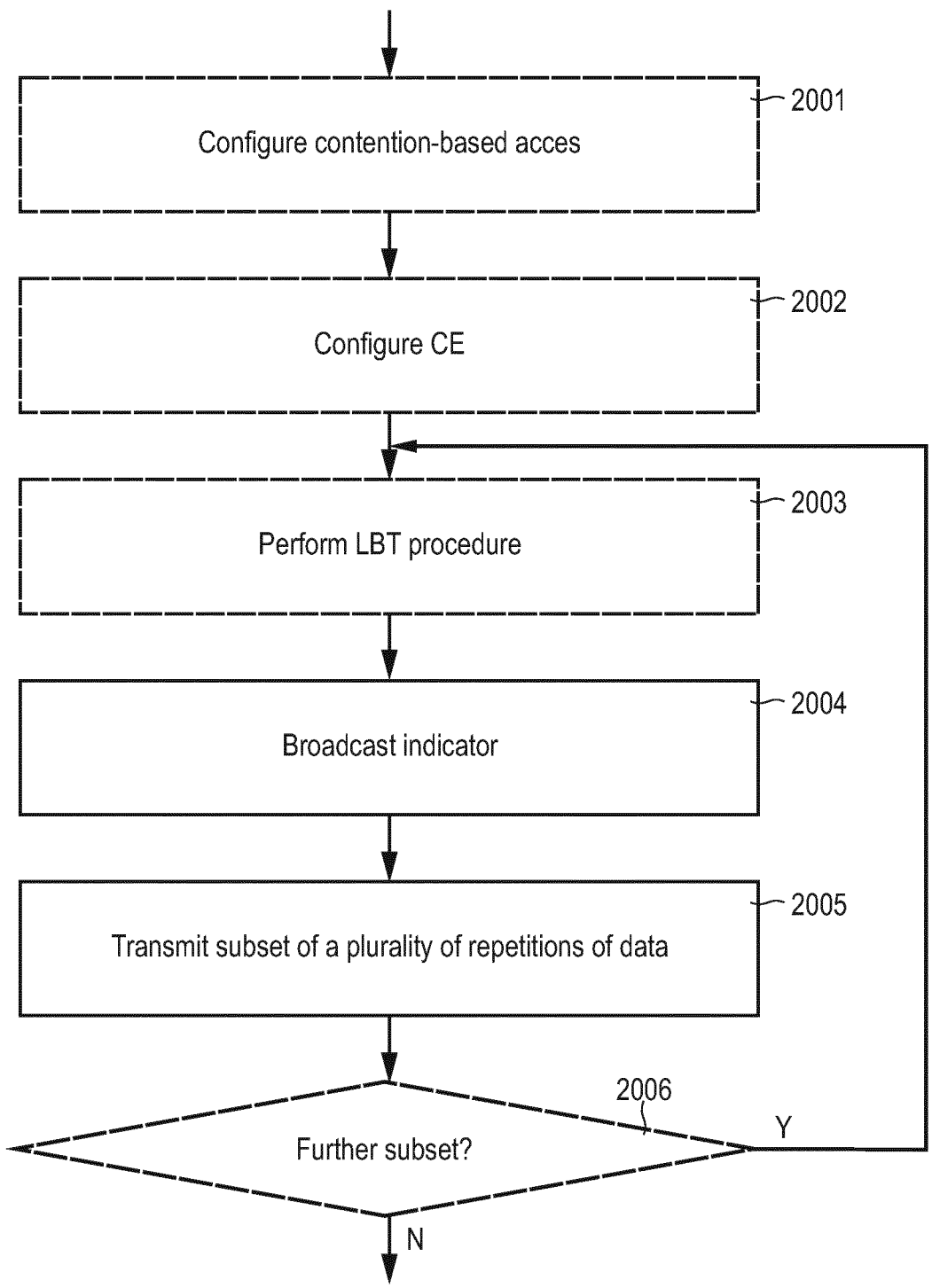
FIG. 8 is a flowchart of a method according to various examples.

FIG. 8 is a flowchart of a method according to various examples. For example, the method according to FIG. 8 could be executed by the control circuitry 130-1 of the UE 130. Optional blocks are indicated in FIG. 8 by using dashed lines.

Initially, at optional block 2001, contention-based access to an open spectrum is configured. This may include control signaling from a network. Alternatively or additionally, contention-based access may include lookup in a preconfigured access table locally stored, e.g., at a non-volatile memory. Configuring contention-based access may include setting parameters associated with transmission opportunities, a LBT procedure, and/or a back-off procedure. For example, it could be possible to configure the threshold duration 6310 (cf. FIG. 5) in block 2001. For example, an energy threshold for LBT procedures may be configured.

Next, at optional block 2002, a CE policy is configured. This may include control signaling from a network. Alternatively or additionally, configuring the CE policy may include lookup in a preconfigured table which is locally stored, e.g., in a non-volatile memory. Configuring the CE policy may include setting parameters associated with encoding raw data into redundancy versions (cf. FIG. 2 and FIG. 3). Alternatively or additionally, a repetition level, i.e., an overall count of repetitions across multiple subsets, may be configured according to the CE policy. The CE policy may also define whether or not multiple repetitions are to be split into subsets. Here, hardware limitations may be taken into account. Alternatively, or additionally, it would be possible to take into account the threshold configuration according to block 2001.

Next, at optional block 2003, a LBT procedure is performed. The LBT procedure may be in response to the need for transmitting data on an open spectrum, e.g., if data is in a transmit buffer. An energy level on resources of the open spectrum may be compared with an energy threshold, e.g., as configured in block 2001. Such channel occupancy measurements may help to identify whether collision is likely to occur in a subsequent transmission.

At block 2004, an indicator is broadcasted or, generally, transmitted. For example, the indicator 6011 as discussed in connection with FIGS. 4 and 5 may be transmitted. The indicator transmitted in block 2004 is for control of contention-based access to the open spectrum by at least one further, potentially interfering device.

For example, the indicator may be indicative of resources on the open spectrum required for transmitting a current subset(s) of a plurality of repetitions, wherein the plurality of repetitions may be defined by the repetition level of the CE policy. One or more current subsets are transmitted at block 2005 of the current iteration of blocks 2003-2005. Alternatively or additionally, the indicator may be indicative of resources on the open spectrum required for transmitting further subsets, beyond the current one or more subsets. Further subsets are transmitted at block 2005 of future iterations of blocks 2003-2005.

Specifically, at 2006 it is checked whether transmission of a further subset of repetitions of the data is required. For example, this may include comparing a count of already transmitted repetitions in previous iterations of block 2005 with an overall count of required repetitions, e.g., defined by the repetition level of the CE policy.

If one or more further subsets are required to be transmitted, a further iteration of 2003-2005 is triggered.

Each iteration of blocks 2003-2005 is, hence, associated with the transmission of one or more current subsets. Further, each iteration of blocks 2003-2005 may be associated with a given transmission opportunity defined by a threshold duration, e.g., as configured in block 2001. In the latter case, it would be possible that the broadcasted indicative of block 2005 is indicative of a count of remaining transmission opportunities until completion of transmission of all repetitions; as such, the indicator could be indicative of a count of remaining iterations of blocks 2003-2005.

Figure 9:
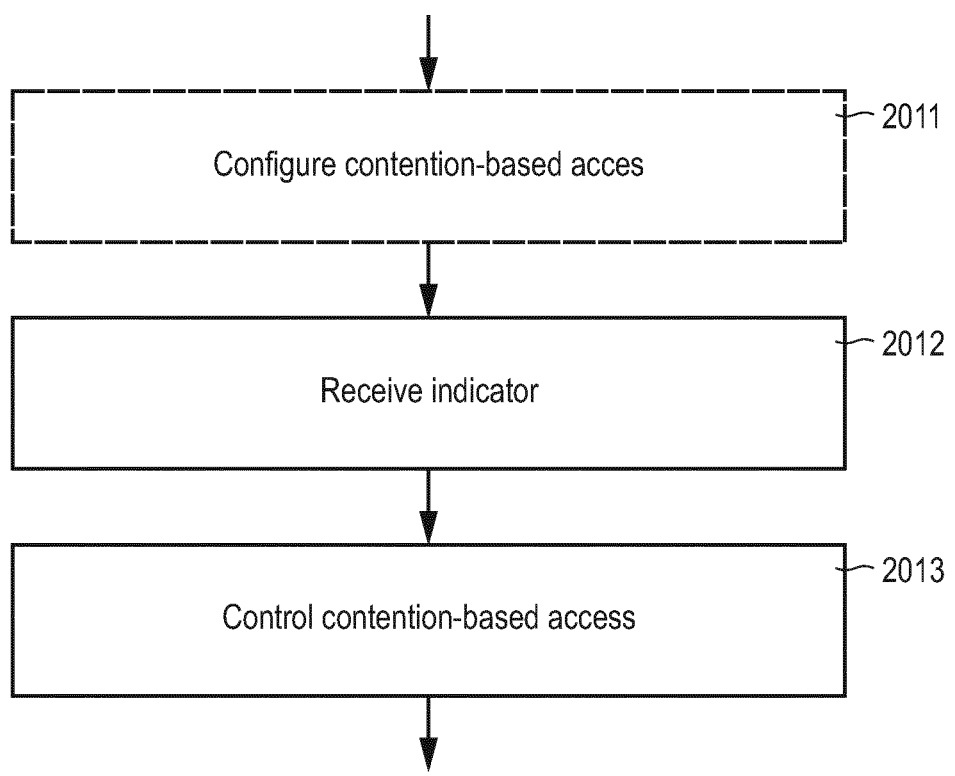
FIG. 9 is a flowchart of a method according to various examples.

FIG. 9 is a flowchart of a method according to various examples. For example, the method according to FIG. 9 could be executed by the control circuitry 131-1 of the UE 131. Optional blocks are identified by dashed lines. The method of FIG. 9 may be inter-related with the method of FIG. 8.

In optional block 2011, contention-based access is configured. Block 2011 corresponds to block 2001 according to FIG. 8. In block 2011, e.g., the setting of a back-off time depending on an indicator associated with transmission of a plurality of repetitions of data and for controlling contention-based access to the open spectrum may be configured.

In block 2012, the indicator is received. The indicator may be broadcasted by a further UE (cf. block 2004). Hence, the indicator may not be protected, such that any device having access to the open spectrum may be able to receive the indicator.

Then, in block 2013, the contention-based access to the open spectrum is controlled in accordance with the indicator.

At block 2013, a rule set as configured in block 2011 may be relied upon. As a general rule, it may be possible to control the contention-based access so as to reduce any attempts for accessing the open spectrum during ongoing transmission of the plurality of repetitions of the data. This us to support finalizing of the repetitions within a short transmission time by mitigating a likelihood of collisions. There are various options available for controlling the contention-based access. One technique may include increasing back-off time. For example, a preset back-off time—e.g., as defined by a rule set of block 2011—could be multiplied by a given factor or extended by a predefined offset. Then, if during a LBT procedure third-party transmission is detected on the open spectrum, a comparably longer back-off time is implemented. This reduces the likelihood of further LBT attempts during the same transmission of the plurality of repetitions.

For example, it would be possible that the back-off time of the contention-based access is set based on the indicators to avoid excess to the open spectrum in any resources indicated by the indicator. This mitigates collision. In one example, it is possible that the indicator is indicative of at least one transmission opportunity required for transmitting one or more a subsets of repetitions of the data. Then, the back-off time of the contention-based access may be set so as to avoid access to the open spectrum prior to completion of the at least one transmission opportunity.

Summarizing, above techniques have been illustrated in connection with a MAC-level indicator for transmission protocols supporting open spectrum access. The indicator helps to inform other devices about the status of transmission repetitions under a CE policy. Other devices using the same open spectrum can be informed on the remaining number of required transmission opportunities to finalize transmission of the repetitions. The indicator helps to mitigate collision during IOT transmissions that require multiple transmission opportunities.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various techniques have been described with respect to multiple repetitions of UL data. Similar techniques may also be employed for multiple repetitions of DL data or sidelink data.

For further illustration, above, various techniques have been described with respect to multiple repetitions transmitted under a CE policy. However, such techniques may also be applicable to scenarios where the multiple repetitions are not transmitted under CE policy and, e.g., are not for combined decoding. Then, it would be possible that different repetitions included data encoded according to different redundancy versions.

Still further, above various scenarios have been described where subsets are formed based on a threshold time duration limiting the contiguous access to the open spectrum. In other examples, subsets may be formed for other reasons, e.g., hardware limitations, etc.

The invention claimed is:
1. A method of operating a first device, comprising:
broadcasting, on spectrum with contention-based access, an indicator associated with transmission of a plurality of repetitions of data to a second device, the indicator being for control of contention-based access to the spectrum by at least one further device, and in response to said transmitting of the indicator: transmitting, on the spectrum, a subset of the plurality of repetitions of the data to the second device, wherein access to the spectrum is in accordance with transmission opportunities defined by a predefined threshold duration, wherein the indicator is indicative of at least one transmission opportunity required for transmitting the subset of the plurality of repetitions of the data and/or required for transmitting at least one subsequently transmitted further subset of the plurality of repetitions of the data, wherein the indicator is indicative whether any further transmission opportunities are required for transmitting the transmission of the plurality of repetitions of the data, beyond the at least one current transmission opportunity required for transmitting the subset of the plurality of repetitions of the data.

2. The method of claim 1,
wherein the indicator is indicative of resources on the spectrum required for transmitting the subset of the plurality of repetitions of the data and/or required for transmitting at least one subsequently transmitted further subset of the plurality of repetitions of the data.

3. The method of claim 1,
wherein the indicator is indicative of at least one of a timing and a count of the at least one transmission opportunity.

4. The method of claim 1,
wherein the indicator is indicative of a repetition level associated with the plurality repetitions of the data, the repetition level being defined by a coverage enhancement policy.

5. The method of claim 1,
wherein the indicator is included in a preamble message of the subset of the plurality of repetitions of the data.

6. The method of claim 1,
wherein the plurality of repetitions all include data encoded according to the same redundancy version for combined decoding at the second device.

7. The method of claim 1, further comprising:
receiving, from a second device and on the spectrum, a second indicator associated with transmission of a plurality of repetitions of data from the second device to a third device, and based on the second indicator: controlling contention-based access to the spectrum by the first device.

8. The method of claim 7,
wherein the second indicator is indicative of resources on the spectrum required for transmitting the subset of the plurality of repetitions of the data and/or required for transmitting at least one subsequently transmitted further subset of the plurality of repetitions of the data, wherein the method further comprises:
setting a back-off time of the contention-based access to avoid access to the spectrum in the resources.

9. The method of claim 7,
wherein access to the spectrum is in accordance with at least one transmission opportunity defined by a predefined threshold duration, wherein the indicator is indicative of at least one transmission opportunity required for transmitting the subset of the plurality of repetitions of the data and/or required for transmitting at least one subsequently transmitted further subset of the plurality of repetitions of the data, wherein the method further comprises:
setting a back-off time of the contention-based access to avoid access to the spectrum prior to completion of the at least one transmission opportunity.

10. A method of operating a first device, comprising:
broadcasting, on spectrum with contention-based access, an indicator associated with transmission of a plurality of repetitions of data to a second device, the indicator being for control of contention-based access to the spectrum by at least one further device, and in response to said transmitting of the indicator: transmitting, on the spectrum, a subset of the plurality of repetitions of the data to the second device, in response to transmitting the subset of the plurality of repetitions of the data: implementing a listen-before-talk procedure on the spectrum, in response to implementing the listen-before-talk procedure: broadcasting, on the spectrum, a further indicator associated with transmission of the plurality of repetitions of the data to the second device, the further indicator being for control of contention-based access to the spectrum by the at least one further device, and in response to said transmitting of the further indicator: transmitting, on the spectrum, a further subset of the plurality of repetitions of the data to the second device.

11. The method of claim 10,
wherein access to the spectrum is in accordance with transmission opportunities defined by a predefined threshold duration, wherein the listen-before-talk procedure is implemented in-between a first transmission opportunity and a second transmission opportunity.

12. A first device comprising control circuitry configured to perform:
broadcasting, on spectrum with contention-based access, an indicator associated with transmission of a plurality of repetitions of data to a second device, the indicator being for control of contention-based access to the spectrum by at least one further device, and in response to said transmitting of the indicator: transmitting, on the spectrum, a subset of the plurality of repetitions of the data to the second device, wherein the control circuitry is further configured to:

in response to transmitting the subset of the plurality of repetitions of the data: implementing a listen-before-talk procedure on the spectrum, in response to implementing the listen-before-talk procedure: broadcasting, on the spectrum, a further indicator associated with transmission of the plurality of repetitions of the data to the second device, the further indicator being for control of contention-based access to the spectrum by the at least one further device, and in response to said transmitting of the further indicator: transmitting, on the spectrum, a further subset of the plurality of repetitions of the data to the second device.

13. The first device according to claim 12,
wherein access to the spectrum is in accordance with transmission opportunities defined by a predefined threshold duration, wherein the listen-before-talk procedure is implemented in-between a first transmission opportunity and a second transmission opportunity.

* * * * *